US011522908B2

(12) United States Patent
Koral et al.

(10) Patent No.: US 11,522,908 B2
(45) Date of Patent: Dec. 6, 2022

(54) USING A MESSAGE BUS CONTROLLER TO PROTECT 5G CORE ELEMENTS

(71) Applicants: AT&T Intellectual Property I, L.P., Atlanta, GA (US); Interwise Ltd., Airport City (IL)

(72) Inventors: Yaron Koral, Cherry Hill, NJ (US); Adi Enzel, Ranana (IL)

(73) Assignees: AT&T Intellectual Property I, L.P., Atlanta, GA (US); Interwise, Ltd., Airport City (IL)

( * ) Notice: Subject to any disclaimer, the term of this patent is extended or adjusted under 35 U.S.C. 154(b) by 0 days.

(21) Appl. No.: 16/953,398

(22) Filed: Nov. 20, 2020

(65) Prior Publication Data

US 2022/0166790 A1  May 26, 2022

(51) Int. Cl.
*H04L 9/40* (2022.01)
*H04L 43/16* (2022.01)
*H04L 41/0893* (2022.01)

(52) U.S. Cl.
CPC ...... *H04L 63/1458* (2013.01); *H04L 41/0893* (2013.01); *H04L 43/16* (2013.01); *H04L 63/1416* (2013.01); *H04L 2463/141* (2013.01)

(58) Field of Classification Search
CPC . H04L 63/1458; H04L 41/0893; H04L 43/16; H04L 63/1416; H04L 2463/141
See application file for complete search history.

(56) References Cited

U.S. PATENT DOCUMENTS 11,196,680 B1 * 12/2021 Caceres ............... H04W 12/06
2019/0335392 A1 * 10/2019 Qiao .................... H04W 76/27

FOREIGN PATENT DOCUMENTS

WO  WO-2020146076 A1 *  7/2020  ........... H04W 12/06
WO  WO-2021155090 A1 *  8/2021

* cited by examiner

*Primary Examiner* — Duc C Ho
(74) *Attorney, Agent, or Firm* — Hartman & Citrin LLC

(57) ABSTRACT

Using a message bus controller to protect 5G core elements can include accessing, by a computing device that executes a message bus controller, a message in a message bus of a packet core of a cellular network. The message can be generated by a first network function and transmitted to a second network function via the message bus, wherein the second network function can subscribe to messages from the first network function. The computing device can determine if delivery of the message to the second network function should be restricted. If so, the computing device can drop the message, and if not, the computing device can allow a message flow associated with the message to resume.

20 Claims, 9 Drawing Sheets

USING A MESSAGE BUS CONTROLLER TO PROTECT 5G CORE ELEMENTS

BACKGROUND

The fifth generation ("5G") technology standard for cellular networks introduces a fundamental change in the architecture of the packet core by organizing the packet core as a service-based architecture. This change provides enhanced flexibility for elements of the cellular network in terms of enabling communication among the elements, as well as with regard to scalability. In particular, elements can be added or removed on demand by allocating resources to host the elements.

The change also can provide improved visibility of the cellular network. In particular, because network elements can communicate via messages, and therefore need not be joined by physical interfaces, messages between the network elements can be analyzed to understand how the cellular network is being used. For example, control messages may traverse the cellular network, and through examination of these control messages, use and/or function of the cellular network can be known.

The control messages can be distributed among the network elements via a messaging bus in the core. Messages can be subscribed to by network elements so the network elements can be updated on operation of the cellular network and/or can cooperate with other network elements.

With the new 5G standard, however, comes new concerns. In particular, the 5G network can be scalable to support increasing demand of the cellular network. This increasing demand is expected to continue to increase as Internet-of-things technologies and devices result in a continued proliferation of more and more devices seeking to access cellular communication resources. The 5G network, however, may have limited protection against device-on-device attacks, as network security for cellular networks has typically been focused on attacks from the Internet or other carrier networks, or on the devices themselves (e.g., ensuring that the devices are free of malware and/or resistant to hacking and/or malware attacks).

SUMMARY

The present disclosure is directed to using a message bus controller to protect 5G core elements. A 5G cellular network such as the cellular network can include a packet core (hereinafter referred to simply as a/the "core"). The cellular network also can include communication hardware such as cell site hardware, radios, radio controllers, antennas, and the like, which collectively can provide functionality associated with a cellular network cell (these and other hardware that provide such functionality are collectively referred to hereinafter as "cells"). The cells can enable communications between the cellular network and one or more user devices connecting to the cellular network. The core can be provided by a number of network functions, which can provide the functionality of the cellular network. The network functions can communicate with one another, in some embodiments, by way of a unified centric message bus (hereinafter referred to simply as a/the "message bus").

Messages associated with a network function can be provided to and/or injected into the message bus, and one or more other network functions or other devices can subscribe to the messages. In some embodiments of the concepts and technologies disclosed herein, the core can include a computing device, which can host and/or execute a message bus controller. The message bus controller can be configured to subscribe to all messages in the core, and to analyze the messages to detect actions and/or behavior (determined based on analysis of the messages) that may or do pose a threat to the operation of the core and/or the cellular network as a whole.

In some embodiments of the concepts and technologies disclosed herein, a threat monitor and/or one of the network functions (e.g., the network data analytic function) can be configured to monitor signaling and/or message exchanges in the cellular network to detect threats to the core and/or the cellular network. For example, by monitoring messages and/or other actions of the cellular network, the network data analytic function and/or the threat monitor can detect certain types of attacks such as, for example, DDoS attacks and/or attempts to overload the core. The network data analytic function can generate contextual messages that can describe abnormal behavior on the cellular network and can inject the contextual messages into the message bus. In some other embodiments, the threat monitor can be configured to pass the contextual messages directly to the message bus controller via a separate interface.

The message bus controller can be configured to perform a context-based analysis of messaging associated with the cellular network and/or a non-context-based analysis of the messaging. In some embodiments of the context-based analysis, for example, the message bus controller can obtain a contextual message and identify abnormal behavior in the cellular network based on the contextual message. The message bus controller can access a message in the message bus. The message bus controller can identify messages associated with the abnormal behavior and determine if the message is associated with the abnormal behavior or not. If so, the message bus controller can interrupt flow of the message (e.g., drop the message, or the like). If not, the message bus controller can allow the message flow to resume.

In some embodiments of the non-context-based analysis of messaging, the message bus controller can access a message from the message bus. The message bus controller can determine if the message is directed to a sensitive element in the cellular network. This determination can be made in a number of manners. If the message is directed to a sensitive element, the message bus controller can determine one or more messaging thresholds associated with the sensitive element. In some embodiments, the message bus controller can determine a capacity of the sensitive element, and define the messaging thresholds as some portion of the capacity. The message bus controller can determine if the messaging thresholds are or will be exceeded by the messaging. If not, the message bus controller can allow the flow of the message to resume. If so, the message bus controller can drop the message, delete the message, and/or perform other operations to interrupt the flow of the message. These and other aspects of the concepts and technologies disclosed herein will be illustrated and described herein.

According to one aspect of the concepts and technologies disclosed herein, a system is disclosed. The system can include a processor and a memory. The memory can store computer-executable instructions that, when executed by the processor, cause the processor to perform operations. The operations can include accessing, by a computing device that executes a message bus controller, a message in a message bus of a packet core of a cellular network. The message can be generated by a first network function and transmitted to a second network function via the message bus. The second network function can subscribe to messages from the first network function. The operations also can include determining, by the computing device, if delivery of the message to the second network function should be restricted; dropping, by the computing device, the message in response to a determination that the delivery of the message to the second network function should be restricted; and resuming, by the computing device, a message flow associated with the message in response to a determination that the delivery of the message to the second network function should not be restricted.

In some embodiments, determining if the delivery of the message to the second network function should not be restricted can include determining, by the computing device, if the message is directed to a sensitive element. The sensitive element can include a network element that is susceptible to overflow or distributed denial of service attacks. The determining if the delivery of the message to the second network function should not be restricted can also include in response to a determination that the message is not directed to the sensitive element, determining, by the computing device, that the delivery of the message to the second network function should not be restricted.

In some embodiments, determining if the delivery of the message to the second network function should not be restricted can include: determining, by the computing device, if the message is directed to a sensitive element, the sensitive element can include a network element that is susceptible to overflow or distributed denial of service attacks; and in response to a determination that the message is directed to the sensitive element, determining, by the computing device, a capacity of the sensitive element, defining, by the computing device, a message threshold for the sensitive element based on the capacity determined, determining, by the computing device, if the message threshold is exceeded, if a determination is made that the message threshold is exceeded, dropping, by the computing device, the message, and if a determination is made that the message threshold is not exceeded, determining, by the computing device, that the delivery of the message to the second network function should not be restricted.

In some embodiments, determining if the delivery of the message to the second network function should not be restricted can include accessing, by the computing device, a contextual message that describes abnormal activity in the cellular network, the abnormal activity being associated with a user device; identifying, by the computing device, two or more messages that are associated with the abnormal activity; determining, by the computing device and based on the two or more messages, if the message is associated with the abnormal activity; in response to a determination that the message is associated with the abnormal activity, determining, by the computing device, that the delivery of the message to the second network function should be restricted; and in response to a determination that the message is not associated with the abnormal activity, determining, by the computing device, that the delivery of the message to the second network function should not be restricted.

In some embodiments, accessing the contextual message can include obtaining the contextual message from the message bus, where the contextual message can be generated by a network data analytic function operating in the core. In some embodiments, accessing the contextual message can include receiving the contextual message from a threat monitor via a separate interface of the message bus controller, where the contextual message can be generated by the threat monitor.

According to another aspect of the concepts and technologies disclosed herein, a method is disclosed. The method can include accessing, by a computing device that can include a processor that can execute a message bus controller, a message in a message bus of a packet core of a cellular network. The message can be generated by a first network function and transmitted to a second network function via the message bus. The second network function can subscribe to messages from the first network function. The method also can include determining, by the processor, if delivery of the message to the second network function should be restricted; dropping, by the processor, the message in response to a determination that the delivery of the message to the second network function should be restricted; and resuming, by the processor, a message flow associated with the message in response to a determination that delivery of the message to the second network function should not be restricted.

In some embodiments, determining if the delivery of the message to the second network function should not be restricted can include determining, by the computing device, if the message is directed to a sensitive element. The sensitive element can include a network element that is susceptible to overflow or distributed denial of service attacks. The determining if the delivery of the message to the second network function should not be restricted can also include in response to a determination that the message is not directed to the sensitive element, determining, by the computing device, that the delivery of the message to the second network function should not be restricted.

In some embodiments, determining if the delivery of the message to the second network function should not be restricted can include: determining, by the computing device, if the message is directed to a sensitive element, the sensitive element can include a network element that is susceptible to overflow or distributed denial of service attacks; and in response to a determination that the message is directed to the sensitive element, determining, by the computing device, a capacity of the sensitive element, defining, by the computing device, a message threshold for the sensitive element based on the capacity determined, determining, by the computing device, if the message threshold is exceeded, if a determination is made that the message threshold is exceeded, dropping, by the computing device, the message, and if a determination is made that the message threshold is not exceeded, determining, by the computing device, that the delivery of the message to the second network function should not be restricted.

In some embodiments, the capacity can be determined by the computing device querying the sensitive element to determine the capacity. In some embodiments, the message threshold can be defined by the processor as seventy percent of the capacity determined. In some embodiments, accessing the contextual message can include obtaining the contextual message from the message bus, where the contextual message can be generated by a network data analytic function operating in the core. In some embodiments, accessing the contextual message can include receiving the contextual message from a threat monitor via a separate interface of the message bus controller, where the contextual message can be generated by the threat monitor.

In some embodiments, determining if the delivery of the message to the second network function should not be restricted can include: accessing, by the processor, a contextual message that describes abnormal activity in the cellular network, the abnormal activity being associated with a user device; identifying, by the processor, two or more messages that are associated with the abnormal activity; determining, by the processor and based on the two or more messages, if the message is associated with the abnormal activity; in response to a determination that the message is associated with the abnormal activity, determining, by the processor, that the delivery of the message to the second network function should be restricted; and in response to a determination that the message is not associated with the abnormal activity, determining, by the processor, that the delivery of the message to the second network function should not be restricted.

According to yet another aspect of the concepts and technologies disclosed herein, a computer storage medium is disclosed. The computer storage medium can store computer-executable instructions that, when executed by a processor, cause the processor to perform operations. The operations can include accessing, by a computing device that executes a message bus controller, a message in a message bus of a packet core of a cellular network. The message can be generated by a first network function and transmitted to a second network function via the message bus. The second network function can subscribe to messages from the first network function. The operations also can include determining, by the computing device, if delivery of the message to the second network function should be restricted; dropping, by the computing device, the message in response to a determination that the delivery of the message to the second network function should be restricted; and resuming, by the computing device, a message flow associated with the message in response to a determination that the delivery of the message to the second network function should not be restricted.

In some embodiments, determining if the delivery of the message to the second network function should not be restricted can include determining, by the computing device, if the message is directed to a sensitive element. The sensitive element can include a network element that is susceptible to overflow or distributed denial of service attacks. The determining if the delivery of the message to the second network function should not be restricted can also include in response to a determination that the message is not directed to the sensitive element, determining, by the computing device, that the delivery of the message to the second network function should not be restricted.

In some embodiments, determining if the delivery of the message to the second network function should not be restricted can include: determining, by the computing device, if the message is directed to a sensitive element, the sensitive element can include a network element that is susceptible to overflow or distributed denial of service attacks; and in response to a determination that the message is directed to the sensitive element, determining, by the computing device, a capacity of the sensitive element, defining, by the computing device, a message threshold for the sensitive element based on the capacity determined, determining, by the computing device, if the message threshold is exceeded, if a determination is made that the message threshold is exceeded, dropping, by the computing device, the message, and if a determination is made that the message threshold is not exceeded, determining, by the computing device, that the delivery of the message to the second network function should not be restricted.

In some embodiments, determining if the delivery of the message to the second network function should not be restricted can include accessing, by the computing device, a contextual message that describes abnormal activity in the cellular network, the abnormal activity being associated with a user device; identifying, by the computing device, two or more messages that are associated with the abnormal activity; determining, by the computing device and based on the two or more messages, if the message is associated with the abnormal activity; in response to a determination that the message is associated with the abnormal activity, determining, by the computing device, that the delivery of the message to the second network function should be restricted; and in response to a determination that the message is not associated with the abnormal activity, determining, by the computing device, that the delivery of the message to the second network function should not be restricted.

In some embodiments, accessing the contextual message can include obtaining the contextual message from the message bus, where the contextual message can be generated by a network data analytic function operating in the core. In some embodiments, accessing the contextual message can include receiving the contextual message from a threat monitor via a separate interface of the message bus controller, where the contextual message can be generated by the threat monitor.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
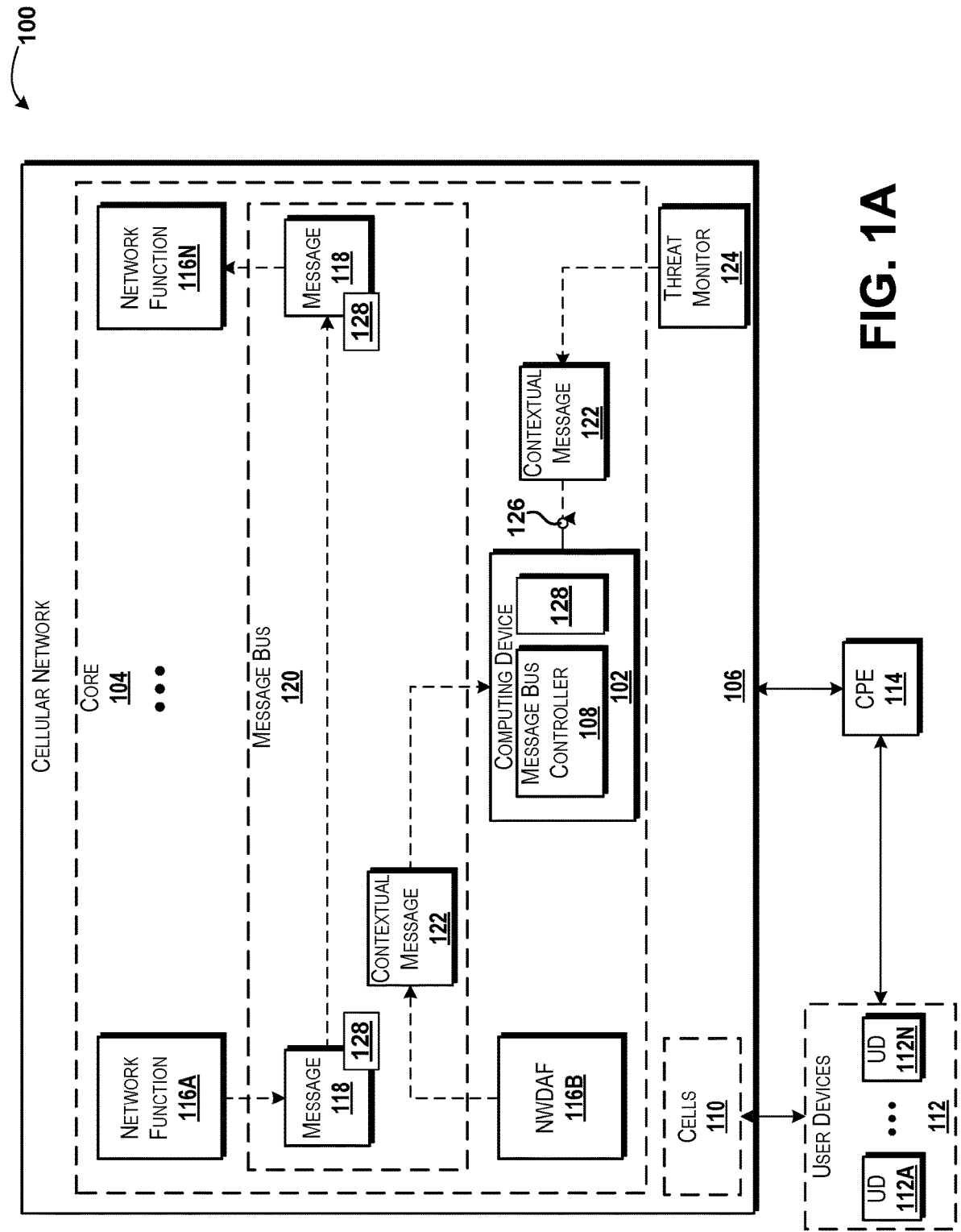
FIGS. 1A-1D are system diagrams illustrating an illustrative operating environment for various embodiments of the concepts and technologies described herein.

The following detailed description is directed to using a message bus controller to protect 5G core elements. A 5G cellular network such as the cellular network can include a packet core (hereinafter referred to simply as a/the "core"). The cellular network also can include communication hardware such as cell site hardware, radios, radio controllers, antennas, and the like, which collectively can provide functionality associated with a cellular network cell (these and other hardware that provide such functionality are collectively referred to hereinafter as "cells"). The cells can enable communications between the cellular network and one or more user devices connecting to the cellular network. The core can be provided by a number of network functions, which can provide the functionality of the cellular network. The network functions can communicate with one another, in some embodiments, by way of a unified centric message bus (hereinafter referred to simply as a/the "message bus").

Messages associated with a network function can be provided to and/or injected into the message bus, and one or more other network functions or other devices can subscribe to the messages. In some embodiments of the concepts and technologies disclosed herein, the core can include a computing device, which can host and/or execute a message bus controller. The message bus controller can be configured to subscribe to all messages in the core, and to analyze the messages to detect actions and/or behavior (determined based on analysis of the messages) that may or do pose a threat to the operation of the core and/or the cellular network as a whole.

In some embodiments of the concepts and technologies disclosed herein, a threat monitor and/or one of the network functions (e.g., the network data analytic function) can be configured to monitor signaling and/or message exchanges in the cellular network to detect threats to the core and/or the cellular network. For example, by monitoring messages and/or other actions of the cellular network, the network data analytic function and/or the threat monitor can detect certain types of attacks such as, for example, DDoS attacks and/or attempts to overload the core. The network data analytic function can generate contextual messages that can describe abnormal behavior on the cellular network and can inject the contextual messages into the message bus. In some other embodiments, the threat monitor can be configured to pass the contextual messages directly to the message bus controller via a separate interface.

The message bus controller can be configured to perform a context-based analysis of messaging associated with the cellular network and/or a non-context-based analysis of the messaging. In some embodiments of the context-based analysis, for example, the message bus controller can obtain a contextual message and identify abnormal behavior in the cellular network based on the contextual message. The message bus controller can access a message in the message bus. The message bus controller can identify messages associated with the abnormal behavior and determine if the message is associated with the abnormal behavior or not. If so, the message bus controller can interrupt flow of the message (e.g., drop the message, or the like). If not, the message bus controller can allow the message flow to resume.

In some embodiments of the non-context-based analysis of messaging, the message bus controller can access a message from the message bus. The message bus controller can determine if the message is directed to a sensitive element in the cellular network. This determination can be made in a number of manners. If the message is directed to a sensitive element, the message bus controller can determine one or more messaging thresholds associated with the sensitive element. In some embodiments, the message bus controller can determine a capacity of the sensitive element and can define the messaging thresholds as some portion of the capacity. The message bus controller can determine if the messaging thresholds are or will be exceeded by the messaging. If not, the message bus controller can allow the flow of the message to resume. If so, the message bus controller can drop the message, delete the message, and/or perform other operations to interrupt the flow of the message. These and other aspects of the concepts and technologies disclosed herein will be illustrated and described herein.

In mobility networks, new security attacks and methods may seemingly be created continuously. One issue with mobility networks is that changes on interfaces and changes in device and/or network behavior can sometimes take months or years, as making such changes in mobility networks can include not only the introduction of new standards, but also coordinating with vendors to introduce new hardware, software, interfaces, and/or functionality. As will be appreciated from the description herein, embodiments of the concepts and technologies disclosed herein can shorten response times and give carriers and network operations entities control over the mobility network. Thus, embodiments of the concepts and technologies disclosed herein can shorten response time to new threats and/or attacks, thereby improving quality of experience for customers and reduce costs associated with network operations. Swiftly addressing new threats can protect the cellular network and/or the core thereof from shutdowns and/or other types of malfunctions that may affect quality of service and/or quality of experience. These and other advantages of the concepts and technologies disclosed herein will be more apparent with reference to the FIGURES illustrated and described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIGS. 1A-1D, aspects of an operating environment 100 for various embodiments of the concepts and technologies disclosed herein for using a message bus controller to protect 5G core elements will be described, according to an illustrative embodiment. The operating environment 100 shown in FIG. 1A includes a computing device 102. The computing device 102 can operate in communication with and/or as part of a packet core ("core") 104 of a network such as a cellular communications network ("cellular network") 106. According to various embodiments of the concepts and technologies disclosed herein, the cellular network 106 can include a 5G cellular network. For purposes of the specification and the claims, the phrase "cellular network" is used to refer exclusively to a 5G cellular network unless another type of network is explicitly recited.

According to various embodiments, the functionality of the computing device 102 may be provided by one or more server computers, desktop computers, laptop computers, other computing systems, and the like. It should be understood that the functionality of the computing device 102 can be provided by a single device, by two or more similar devices, and/or by two or more dissimilar devices. For purposes of describing the concepts and technologies disclosed herein, the computing device 102 is described herein as a server computer. It should be understood that this embodiment is illustrative and should not be construed as being limiting in any way.

The computing device 102 can execute an operating system (not labeled in FIGS. 1A-1D) and one or more application programs such as, for example, a message bus controller 108. The operating system can include a computer program for controlling the operation of the computing device 102. The message bus controller 108 can include an executable program that can be configured to execute on top of the operating system to provide various functions as illustrated and described herein. The functionality of the message bus controller 108 will be described in more detail after introducing the other elements of the operating environment 100.

As shown in FIG. 1A, the cellular network 106 also can include one or more cells 110, or other hardware, interfaces, and/or other equipment for communicating with one or more user devices 112A-112N (hereinafter collectively and/or generically referred to as "user devices 112"). The user devices 112 can include, for example, mobile phones, smartphones, or other user equipment; Internet-of-things devices; connected car devices; and/or other devices that may be enabled with wireless connectivity for wireless communications with and/or via the cellular network 106. In some embodiments, as shown in FIGS. 1A-1D, one or more of the user devices 112 can communicate with the cellular network 106 via other hardware and/or Internet connections.

For example, as shown in FIGS. 1A-1D, one or more of the user devices 112 such as, for example, an Internet-of-things device, can communicate with the cellular network 106 via a gateway, router, or other customer premises equipment ("CPE") 114. Thus, although not shown in FIGS. 1A-1D, the operating environment 100 can include additional networks and/or networking connections. As such, the illustrated embodiment should be understood as one example embodiment of the concepts and technologies disclosed herein and therefore should not be construed as being limiting in any way.

According to various embodiments of the concepts and technologies disclosed herein, the user devices 112 can communicate with the cellular network 106 for various reasons. In some instances, the user devices 112 can communicate with the cellular network 106 to perform various functions such as conducting voice sessions, sending messages, conducting data sessions, and the like. These and/or other functions can be supported, in various embodiments, by one or more network functions 116A-N (hereinafter collectively and/or generically referred to as "network functions 116"). The network functions can include, for example, any function that can be involved in conducting communications via the cellular network 106.

In particular, 5G networks such as the cellular network 106 can include virtualized network functions such as the network functions 116. In some embodiments, for example, the network functions 116 can include, but are not limited, a 5G Core Access Mobility Management Function ("AMF"), a 5G session management function ("SMF"), a user plane function ("UPF"), a short message service function ("SMSF"), a 5G network exposure function ("NEF"), a network repository function ("NRF"), a network slice selection function ("NSSF"), a unified data management ("UDM"), an authentication server function ("AUSF"), a policy control function ("PCF"), a network data analytic function ("NWDAF")(labeled with reference numeral 116B in FIGS. 1A-1D), a unified data repository ("UDR"), a security edge protection proxy ("SEPP"), various application functions ("AFs"), other functions, or the like. These and/or other network functions 116 can perform the operations of the cellular network 106.

To perform these functions, the network functions 116 may operate with one another and/or generate one or more messages 118 to communicate with and/or coordinate with one another. Thus, the network functions 116 are not required to have physical interfaces between one another as may have been required in some previous network architectures. In practice, the network functions 116 can publish messages 118 over a shared messaging bus ("message bus") 120, and other network functions 116 can subscribe to these messages 118. In the example shown in FIG. 1A, a message 118 is being published by a first network function 116A, and an nth network function 116N has subscribed to messages 118 from the first network function 116A. Thus, the message 118 is illustrated in FIG. 1A as flowing from the first network function 116A to the nth network function 116N. It should be understood that this example is illustrative, and therefore should not be construed as being limiting in any way.

It can be appreciated that the message 118 illustrated in FIG. 1A can be generated by the network function 116A based on communications with or by a user device 112. In particular, many or even every signaling event in a control plane of the cellular network 106 may result in the publication of a message 118. Thus, it also can be appreciated that with a large number of user devices 112 connecting to a 5G cellular network such as the cellular network 106, a large number of messages 118 can be published at any particular time by the network functions 116. It should be understood that this example is illustrative, and therefore should not be construed as being limiting in any way.

In some embodiments, one or more user devices 112 may cause undue load on the core 104 of the cellular network 106 by prompting the publication of a large number of messages 118 by generating signaling events. For example, a user device 112 may, deliberately or due to a malfunction or malware, generate a large amount of communication events such as, for example, attaching to a network, triggering handoffs from one cell 110 to another cell 110, or the like. Such acts may trigger a large number of messages 118 and, in some circumstances, may cause an overload of the core 104. If the core 104 is overloaded, other legitimate communications and/or uses may be denied. Such attacks are sometimes coordinated by multiple user devices 112 and may include distributed denial of service ("DDoS") attacks. Some example embodiments of the concepts and technologies disclosed herein can be implemented to prevent overload of the core 104 and/or to remediate or block DDoS attacks by introducing a monitoring and intervention function that can monitor and/or control the messages 118 in the message bus 120. It should be understood that this example is illustrative, and therefore should not be construed as being limiting in any way.

As shown in FIG. 1A, and as mentioned above, the core 104 can include the network data analytic function 116B. The network data analytic function 116B can be configured, in some embodiments, to send context notification messages ("contextual message") 122 that can describe and/or identify specific abnormal behavior events in the cellular network 106 and/or the core 104. According to various embodiments of the concepts and technologies disclosed herein, the contextual message 122 can include one or more parameters. These parameters can be included, in some embodiments, in a header of the contextual message 122 or can constitute the body of the contextual message 122 itself. Because the parameters and/or other indicators can be included in the contextual message 122 in a number of manners, it should be understood that these examples are illustrative, and therefore should not be construed as being limiting in any way.

The parameters or other portion of the contextual message 122 can identify, for example, messages 118 and/or groups of messages 118 that should be restricted based on abnormal activity detected in the cellular network 106. As such, it can be appreciated that the contextual message 122 can identify, for example, specific user devices 112 that may be acting or behaving abnormally (e.g., identified by a subscription permanent identifier ("SUPI") or other identifier), a group of user devices 112 under a certain cell site ID, a group of user devices 112 under a certain group (e.g., Internet-of-things devices or roaming devices, which can be based, for example on a mobile network code ("MNC") or the like), and/or other identifiers.

According to various embodiments of the concepts and technologies disclosed herein, the contextual message 122 can be injected into the message bus 120 by the network data analytic function 116B as a message in a manner that can be similar to the manner in which the messages 118 are injected into the message bus 120. The message bus controller 108 can subscribe to the contextual message 122, as shown in FIG. 1A (illustrated by showing the contextual message 122 flowing to the computing device 102 via the message bus 120). It should be understood that this example is illustrative, and therefore should not be construed as being limiting in any way.

Additionally, or alternatively, the message bus controller 108 can support a separate interface 126 that can be configured to provide an interface via which the computing device 102 can receive the contextual message 122 from a threat monitor 124. According to various embodiments of the concepts and technologies disclosed herein, the threat monitor 124 can be included as an element in the core 104, or can be external to the core 104, as shown in FIGS. 1A-1D. In some embodiments, the functionality of the threat monitor 124 can be performed by a network function 116 in the core 104 such as, for example, the network data analytic function 116B, as will be explained in more detail below. As such, the illustrated embodiment should be understood as being illustrative of the concepts and technologies disclosed herein and should not be construed as being limiting in any way.

The threat monitor 124 can be configured to identify threats from various user devices 112 (e.g., through monitoring of the cellular network 106 and/or monitoring messages 118 in the message bus 120) and to generate the contextual message 122, which can be provided to the message bus controller 108 via the separate interface 126, if included. Regardless of how the message bus controller 108 receives the contextual message 122, it can be appreciated that the message bus controller 108 can be configured to receive the messages 118 as a subscriber (via the message bus 120), and to obtain the contextual message 122 as a subscriber via the message bus 120 or directly via the separate interface 126. It should be understood that these examples are illustrative, and therefore should not be construed as being limiting in any way.

According to various embodiments of the concepts and technologies disclosed herein, the message bus controller 108 can be configured to monitor and/or control the message bus 120 and/or messages 118 in the message bus 120. According to various embodiments of the concepts and technologies disclosed herein, the message bus controller 108 can subscribe to some or all messages 118 in the message bus 120. In a preferred embodiment, the message bus controller 108 can subscribe to all messages 118 in the message bus 120. The message bus controller 108 also can be configured to interrupt message flows associated with the messages 118 in the message bus 120.

Figure 1B:
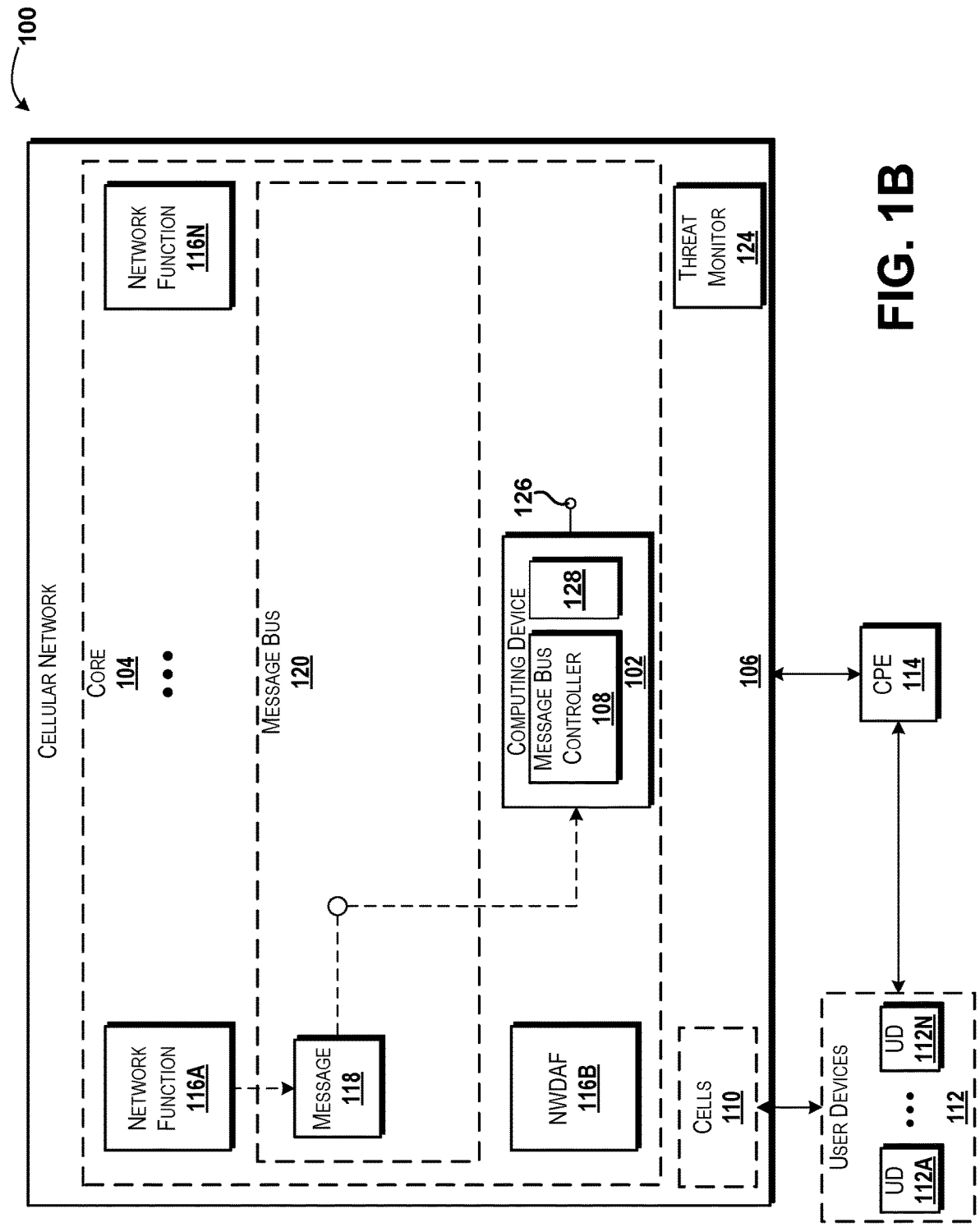

Thus, for example, the message bus controller 108 can be configured to access a message 118 in the message bus 120, effectively interrupting the flow of the message 118 to other subscribers. An example of accessing a message 118 in the message bus 120 is illustrated in FIG. 1B. As can be seen in FIG. 1B, the flow of the message 118 (e.g., to the network function 116N as shown in FIG. 1A) has been interrupted. It should be understood that this example is illustrative, and therefore should not be construed as being limiting in any way. The message bus controller 108 can be configured to determine whether or not the message flow is to be allowed to resume based on a determination as to whether the message 118 poses a threat to the core 104 and/or core elements, as explained herein.

In some embodiments of the concepts and technologies disclosed herein, the message bus controller 108 can perform a context-based analysis of the message 118 to protect network elements of the cellular network 106, and in some other embodiments, the message bus controller 108 can perform a non-context-based analysis of the message 118 to protect network elements of the cellular network 106. Both embodiments are described herein with reference to FIGS. 1A-1D.

In the embodiment of a context-based analysis of the message 118, the message bus controller 108 can be configured to obtain a message 118 from the message bus 120. An example of accessing a message 118 in the message bus 120 is illustrated in FIG. 1B. It should be understood that this example is illustrative, and therefore should not be construed as being limiting in any way. The message bus controller 108 can also be configured to access one or more contextual messages 122. An example of accessing a contextual message 122 is illustrated in FIG. 1A, which shows how the contextual message 122 can be accessed from the message bus 120 (if generated by the network data analytic function 116B or other element) or received via the separate interface 126 from the threat monitor 124. Because the contextual message 122 can be obtained in other manners, it should be understood that these examples are illustrative, and therefore should not be construed as being limiting in any way.

As noted above, the contextual messages 122 can be generated when threats are noted by network elements (e.g., the network data analytic function 116B or the threat monitor 124). The contextual messages 122 can identify abnormal activity, a threat, and/or an attack, as well as devices and/or network elements associated with the attack. The message bus controller 108 can determine, based on the contextual message 122, if the message 118 is associated with an attack or threat to the core 104 (e.g., if the message 118 is part of a DDoS attack, an attempt to overload the core 104, or the like). In some embodiments, the message bus controller 108 can make this determination by determining the type of attack described by the contextual message 122 and determining, based on the determined type, what type of messages 118 are expected to be involved in the attack. Messages 118 of the type identified can be restricted by the message bus controller 108, as will be explained below. It should be understood that this example is illustrative, and therefore should not be construed as being limiting in any way.

Similarly, as noted above, the contextual message 122 can identify specific user devices 112 that may be acting or behaving abnormally and therefore may pose a threat to the core 104. According to various embodiments, the contextual message 122 can identify the user devices 112 by, for example, a SUFI or other identifier, a group of user devices 112 under a certain cell site ID, a group of user devices 112 under a certain group (e.g., Internet-of-things devices or roaming devices, or the like), and/or the like. As such, the message bus controller 108 can analyze the message 118 and the contextual message 122, and determine if the message 118 relates to an abnormally acting user device 112 or other device. If the message 118 is determined by the message bus controller 108 to relate to an abnormally acting or behaving device, the message bus controller 108 can restrict the messages 118.

Figure 1C:
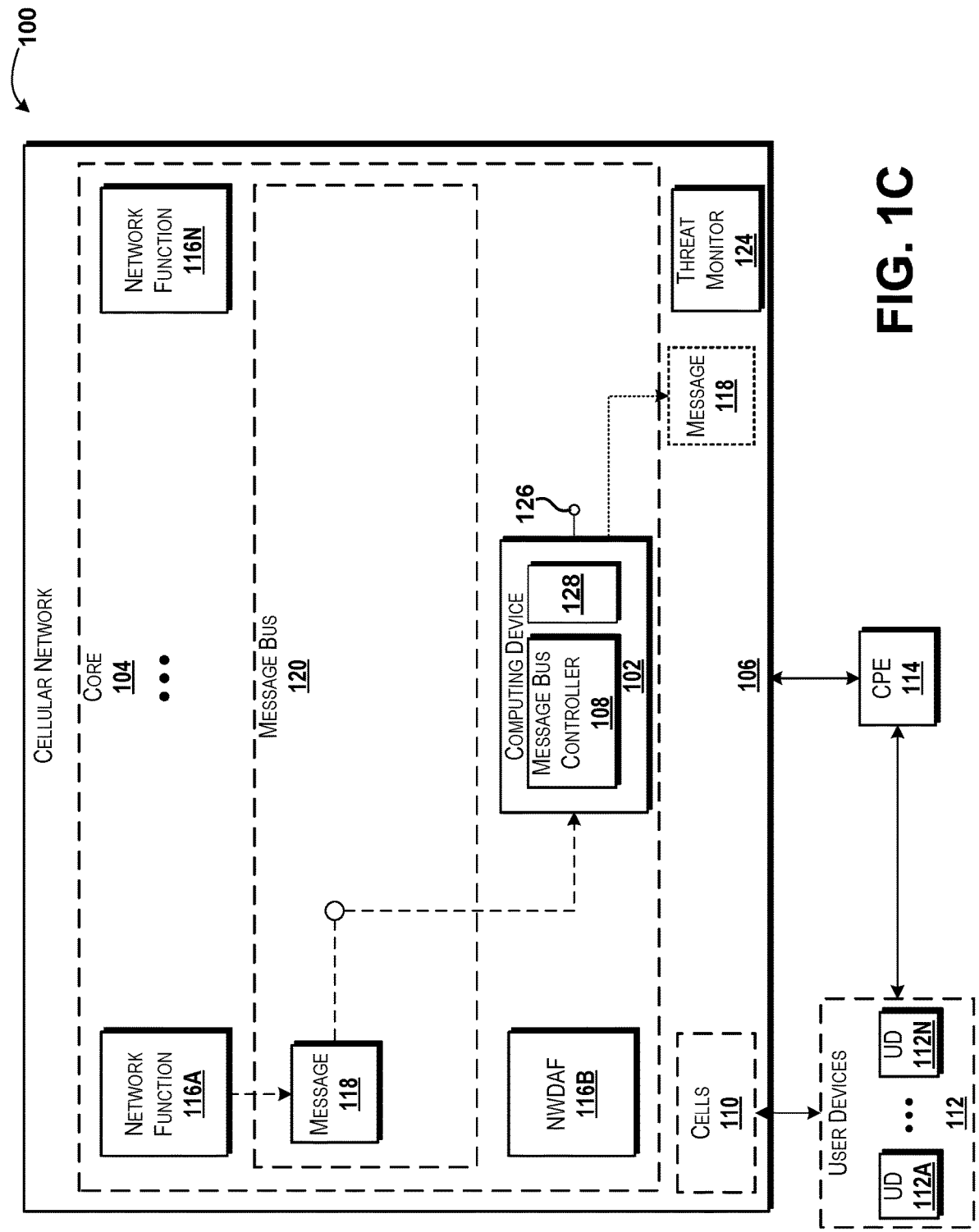

In particular, the message bus controller 108 can be configured to restrict the flow of messages 118 by, for example, dropping or deleting the message 118 from the message bus 120, restricting some messages 118 from flowing or being delivered, and/or taking other actions with respect to the message 118. An example of dropping or deleting a message 118 from the message bus 120 or otherwise interfering with the flow of the message 118 through the message bus 120 is illustrated in FIG. 1C (where the message 118 is represented as being removed from the message bus 120 and deleted by the message bus controller 108). It should be understood that this example is illustrative, and therefore should not be construed as being limiting in any way.

Figure 1D:
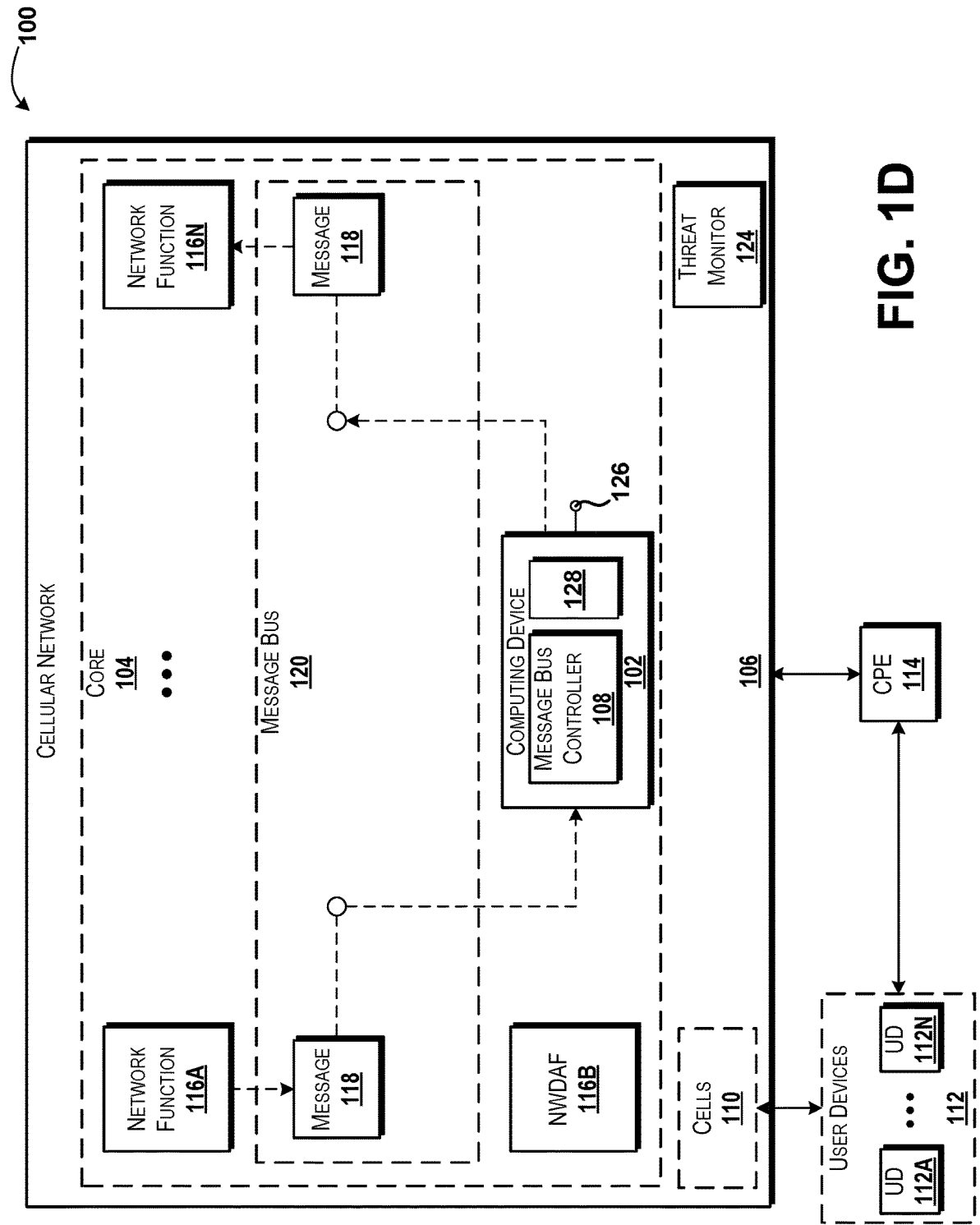

Thus, it can be appreciated that the message bus controller 108 can remove the message 118 from the message bus 120 to prevent distribution to the other network functions 116 that subscribe to the messages 118, in some embodiments. If the message bus controller 108 determines that the message 118 does not relate to an abnormally acting or behaving device, the message bus controller 108 can allow the message flow to resume. In particular, the message bus controller 108 can be configured to re-inject or return the message 118 to the message bus 120 to enable the message 118 to resume the intended flow of the message 118 to the intended recipient/subscriber. An example of allowing a flow of the message 118 in the message bus 120 to resume is illustrated in FIG. 1D. It should be understood that this example is illustrative, and therefore should not be construed as being limiting in any way.

In another embodiment, the message bus controller 108 may be configured to manage the messages 118 using the non-context-based analysis. In particular, the message bus controller 108 can be configured to access a message 118 from the message bus 120, as noted above, and to analyze the message 118 without using or accessing a contextual message 122. According to various embodiments of the concepts and technologies disclosed herein, the message bus controller 108 can be configured to determine if the message 118 is directed to (e.g., subscribed to by) an element of the network that is sensitive to overloading, DDoS attacks, etc. For example, the message bus controller 108 can determine if the message 118 is directed to (e.g., subscribed to by) an entity associated with creating and/or managing signaling for a session (e.g., an AMF, an SMF, etc.). Because other sensitive elements can exist on the cellular network 106, it should be understood that these examples are illustrative, and therefore should not be construed as being limiting in any way.

The message bus controller 108 can determine if the message is directed to a sensitive element in a number of ways. In some embodiments, the message bus controller 108 can determine a subscriber or recipient associated with the message 118. In some embodiments, for example, the message bus controller 108 can access a subscription list 128 associated with the message 118. This subscription list 128 can be included in the message 118, in some embodiments, for example in a header of the message 118. Alternatively, the subscription list 128 can be stored by the computing device 102 and/or can be maintained by other network elements, and the message bus controller 108 can access the subscription list 128 to determine a distribution for messages 118 (e.g., by identifying subscribers for the messages 118). Because the message bus controller 108 can determine if the message 118 is directed to (e.g., subscribed to by) a sensitive element in additional and/or alternative manners, it should be understood that these examples are illustrative, and therefore should not be construed as being limiting in any way.

If the message bus controller 108 determines that the message 118 is directed to a sensitive element, the message bus controller 108 can control flow of the message 118. In particular, as noted above, the message bus controller 108 can be configured to restrict the flow of messages 118 to sensitive elements that are susceptible to being overloaded. For example, messages 118 to a PCF, an AUSF, or an AMF may be determined to be directed to sensitive elements. The message bus controller 108 can determine a rate limit for messages 118 to these sensitive elements and drop messages 118 from the message bus 120 that exceed the determined rate. Of course, other methods of restricting the flow of messages 118 to sensitive elements are possible and are contemplated (e.g., redirecting excess messages to a buffer or other data store for temporary or permanent storage). It can be appreciated that dropping messages 118 may impact quality of service or quality of experience for users of the cellular network 106 (e.g., dropping messages 118 may result in dropping a call, losing a voice or data session, disconnecting a user device 112 from the cellular network 106, etc.). Because dropping these messages 118 may improve service for other users, however, such an approach may still be beneficial to the cellular network 106 as a whole.

In one embodiment, the message bus controller 108 can be configured to determine a capacity of the sensitive element, and to set a message rate limit threshold as seventy percent of the determined capacity. The message bus controller 108 can be configured to remove any messages 118 that exceed the seventy percent of capacity threshold from the message bus 120 and be deleted or dropped. In some embodiments, seventy percent is a preferred threshold. It should be understood that other thresholds are possible, and are contemplated, and therefore this example is illustrative, and therefore should not be construed as being limiting in any way.

In practice, a 5G cellular network such as the cellular network 106 can include a core 104. The cellular network 106 also can include communication hardware such as cell site hardware, radios, radio controllers, antennas, and the like ("cells 110"). The cells 110 therefore can enable communications between the cellular network 106 and one or more user devices 112 connecting to the cellular network 106. The core 104 of the cellular network 106 can be provided by a number of network functions 116, which can provide the functionality of the cellular network 106. The network functions 116 can communicate with one another, in some embodiments, by way of a unified centric message bus ("message bus") 120.

Messages 118 associated with a network function 116 can be injected into the message bus 120, and one or more other network functions 116 or other devices can subscribe to the messages 118. In some embodiments of the concepts and technologies disclosed herein, the core 104 can include a computing device 102, which can host and/or execute a message bus controller 108. The message bus controller 108 can be configured to subscribe to all messages 118 in the core 104, and to analyze the messages 118 to detect messages 118 that pose a threat to the operation of the core 104.

In some embodiments of the concepts and technologies disclosed herein, a threat monitor 124 and/or one of the network functions 116 (e.g., the network data analytic function 116B) can be configured to monitor signaling and/or message exchanges in the cellular network 106 to detect threats to the core 104. For example, by monitoring messages 118 and/or other actions of the cellular network 106, the network data analytic function 116B and/or the threat monitor 124 can detect certain types of attacks such as, for example, DDoS attacks and/or attempts to overload the core 104. The network data analytic function 116B can generate contextual messages 122 that can describe abnormal behavior on the cellular network 106 and inject the contextual messages 122 into the message bus 120. In some other embodiments, the threat monitor 124 can be configured to pass the contextual messages 122 directly to the message bus controller 108 via a separate interface 126.

In some embodiments of the concepts and technologies disclosed herein, the network data analytic function 116B and/or the threat monitor 124 can receive input from network functions 116 such as, for example, a security analytic function regarding attacks, elements involved in the attacks, messages 118 associated with those elements, combinations thereof, or the like. As such, it can be appreciated that the monitoring described herein can be performed by various entities in the cellular network 106 and/or the core 104.

The message bus controller 108 can be configured to perform a context-based analysis of messaging associated with the cellular network 106 and/or a non-context-based analysis of the messaging. In some embodiments of the context-based analysis, for example, the message bus controller 108 can obtain a contextual message 122 and identify abnormal behavior in the cellular network 106 based on the contextual message 122. The message bus controller 108 can access a message 118 in the message bus 120. The message bus controller 108 can identify messages associated with the abnormal behavior and determine if the message 118 is associated with the abnormal behavior or not. If so, the message bus controller 108 can interrupt flow of the message 118 (e.g., drop the message 118, delay the message 118, or the like). If not, the message bus controller 108 can allow the message flow to resume.

In the non-context-based analysis of messaging, the message bus controller 108 can access a message 118 from the message bus 120. The message bus controller 108 can determine if the message 118 is directed to a sensitive element in the cellular network 106. This determination can be made in a number of manners. If the message is directed to a sensitive element, the message bus controller 108 can determine one or more messaging thresholds associated with the sensitive element. In some embodiments, the message bus controller 108 can determine a capacity of the sensitive element and define the messaging thresholds as some portion of the capacity. The message bus controller 108 can determine if the messaging thresholds are exceeded by the messaging. If not, the message bus controller 108 can allow the flow of the message 118 to resume. If so, the message bus controller 108 can drop the message 118, delete the message 118, delay the message 118, redirect the message 118, and/or perform other operations to interrupt the flow of the message 118. These and other aspects of the concepts and technologies disclosed herein will be illustrated and described herein.

It should be appreciated that the message bus controller 108 can be configured to control and/or to dynamically configure the capabilities of the message bus 120. Thus, the message bus controller 108 can modify operation of the message bus 120, cause the message bus 120 to drop messages 118 and/or to interrupt flow of the messages 118, and/or to take other operations to implement the actions illustrated and described herein with reference to the computing device 102 and/or the message bus controller 108. It should be understood that this example is illustrative, and therefore should not be construed as being limiting in any way.

FIGS. 1A-1D illustrates one computing device 102, one core 104, one cellular network 106, multiple cells 110, multiple user devices 112, one consumer premises equipment 114, and one threat monitor 124. It should be understood, however, that various implementations of the operating environment 100 can include one or more than one computing device 102; one or more than one core 104; zero, one, or more than one cellular network 106; one or more than one cell 110; one or more than one user device 112, zero, one, or more than one consumer premises equipment 114, and zero, one, or more than one threat monitor 124. As such, the illustrated embodiment should be understood as being illustrative, and should not be construed as being limiting in any way.

Figure 2:
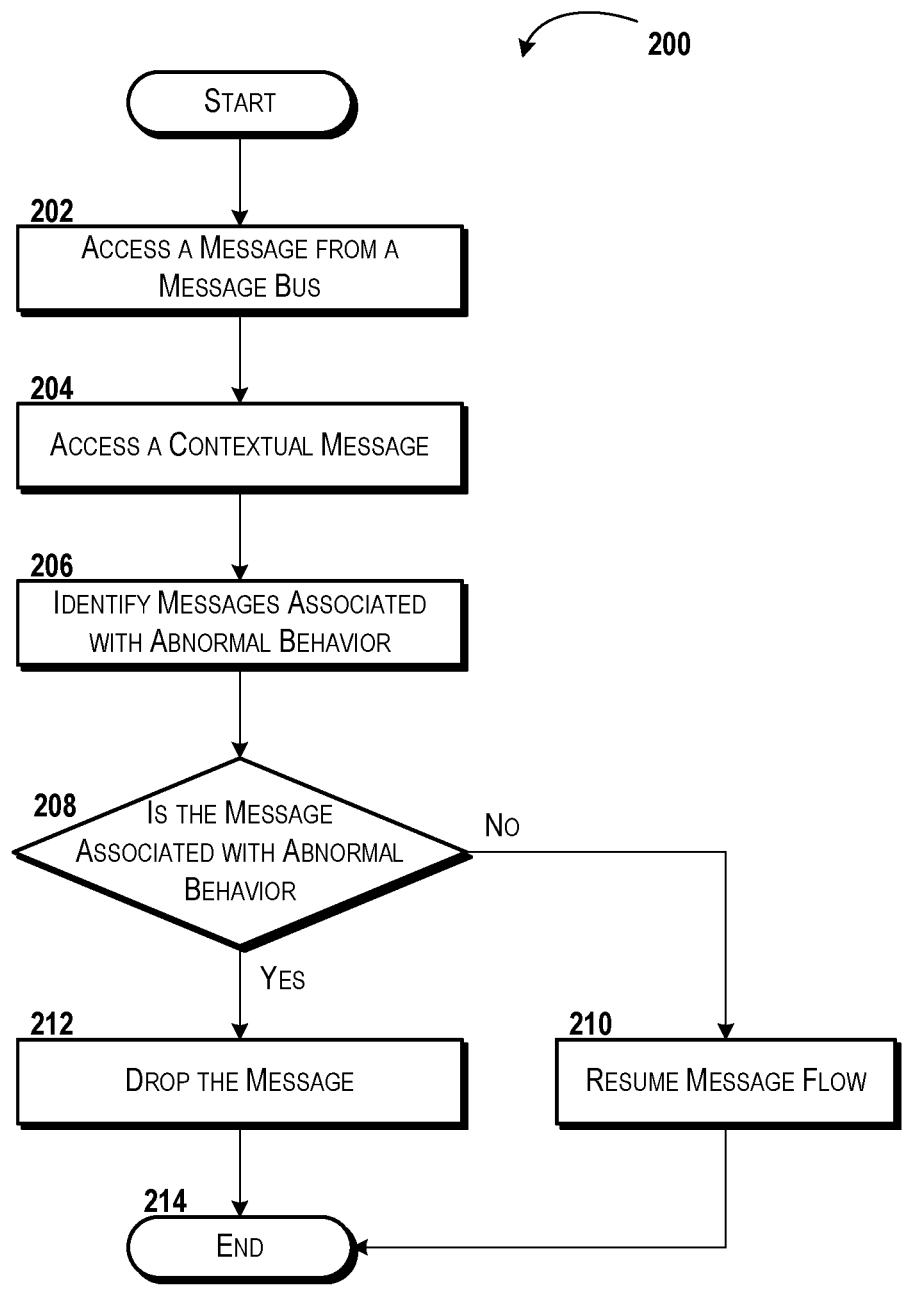
FIG. 2 is a flow diagram showing aspects of a method for using a context-aware message bus controller to protect 5G core elements, according to an illustrative embodiment of the concepts and technologies described herein.

Turning now to FIG. 2, aspects of a method 200 for using a context-aware message bus controller 108 to protect 5G core elements will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, to perform one or more operations and/or causing the processor to direct other components of the computing system or device to perform one or more of the operations.

For purposes of illustrating and describing the concepts of the present disclosure, the method 200 is described herein as being performed by the computing device 102 via execution of one or more software modules such as, for example, the message bus controller 108. It should be understood that additional and/or alternative devices and/or network nodes can provide the functionality described herein via execution of one or more modules, applications, and/or other software including, but not limited to, the message bus controller 108. Thus, the illustrated embodiments are illustrative, and should not be viewed as being limiting in any way.

The method 200 begins at operation 202. At operation 202, the computing device 102 can access a message 118. In some embodiments, the computing device 102 (or the message bus controller 108 executed thereby) can access the message 118 from a message bus 120. As explained above, the computing device 102 (or the message bus controller 108 executed thereby) can be configured to monitor the message bus 120 for messages 118, in some embodiments. In some other embodiments, the computing device 102 (or the message bus controller 108 executed thereby) can be configured to subscribe to all messages 118 generated by elements (e.g., the network functions 116) associated with the core 104.

As such, operation 202 can correspond to the computing device 102 (or the message bus controller 108 executed thereby) accessing a message 118 or receiving the message 118. In some embodiments, the computing device 102 (or the message bus controller 108 executed thereby) can access the message 118 in response to detecting a threat (e.g., by receiving a contextual message 122 as illustrated and described below with reference to operation 204). As such, it should be understood that operation 202 can be performed by the computing device 102 after operation 204, in some embodiments, and that the illustrated embodiment is merely illustrative and therefore should not be construed as being limiting in any way.

From operation 202, the method 200 can proceed to operation 204. At operation 204, the computing device 102 can access, receive, or otherwise obtain a contextual message 122. In some embodiments, the message bus controller 108 can obtain the contextual message 122 from the message bus 120 (e.g., the message bus controller 108 can subscribe to contextual messages 122 generated by the network data analytic function 116B and injected into the message bus 120). In some other embodiments, a threat monitor 124 or other entity can generate the contextual message 122 and provide the contextual message 122 to the message bus controller 108 through a separate interface 126 as explained above. Operation 204 therefore can correspond to the message bus controller 108 obtaining the contextual message 122 from any entity as illustrated and described herein.

As explained above, the contextual message 122 accessed in operation 204 can be generated by a network data analytic function 116B or threat monitor 124 in response to detecting abnormal behavior in the cellular network 106. As such, it should be understood that the contextual message 122 may be accessed, received, or otherwise obtained by the message bus controller 108 at some time before the message 118 is accessed, received, or otherwise obtained (as illustrated at operation 202) or after the message 118 is accessed, received, and/or otherwise obtained. As such, it should be understood that operation 204 can proceed operation 202 as noted above, and that the illustrated order is merely illustrative of one contemplated embodiment. Therefore, the illustrated embodiment should not be construed as being limiting in any way From operation 204, the method 200 can proceed to operation 206. At operation 206, the computing device 102 can identify messages 118 and/or message types that are associated with the abnormal behavior identified in the contextual message 122 accessed in operation 204. According to various embodiments of the concepts and technologies disclosed herein, the contextual message 122 can identify one or more user devices 112 associated with the abnormal behavior that prompted the generation of the contextual message 122.

For example, the contextual message 122 can identify a user device 112, a group of user devices 112 connecting to a certain cell site ID, a group of user devices 112 associated with a certain type of device (e.g., Internet-of-things devices or roaming devices, or the like), and/or the like. As such, the computing device 102 can analyze the contextual message 122 and determine one or more devices and/or device types associated with the abnormal behavior represented in the contextual message 122. The computing device 102 also can identify one or more messages and/or message types associated with the abnormal behavior.

For example, if a particular user device 112 is switching (e.g., "ping-ponging") across neighboring cells 110 in the cellular network 106, a number of handoffs may result. Each handoff can result in a set of messages 118 relating to signaling. In such an embodiment, operation 206 can correspond to the computing device determining the messages 118 and/or message types associated with multiple handoffs. In such an embodiment, for example, the computing device 102 may identify the messages 118 as being any representational state transfer ("REST") messages generated by a particular device. In this example, operation 206 can include identifying REST messages associated with that device as the messages 118 associated with the abnormal behavior. It should be understood that this example is illustrative, and therefore should not be construed as being limiting in any way.

From operation 206, the method 200 can proceed to operation 208. At operation 208, the computing device 102 can determine if the message 118 accessed in operation 202 is associated with the abnormal behavior represented in the contextual message 122. In the example mentioned above with reference to operation 206, operation 208 can include determining if the message 118 accessed in operation 202 is a REST message associated with a specific device as determined in operation 206. It should be understood that this example is illustrative, and therefore should not be construed as being limiting in any way.

If the computing device 102 determines, in operation 208, that the message 118 accessed in operation 202 is not associated with the abnormal behavior represented in the contextual message 122, the method 200 can proceed to operation 210. At operation 210, the computing device 102 can allow the message flow associated with the message 118 accessed in operation 202 to resume. In particular, the computing device 102 can be configured to re-inject or return the message 118 to the message bus 120 to enable the message 118 to resume flow to the intended recipient and/or subscriber.

Alternatively, the computing device 102 can be configured to resend the message, which may result in the message 118 being injected into the message bus 120. Thus, it can be appreciated that operation 210 can correspond to the computing device 102 deciding not to further interrupt or further delay the flow of the message 118. Because the flow of the message 118 can be resumed in additional and/or alternative manners, it should be understood that this example is illustrative, and therefore should not be construed as being limiting in any way.

If the computing device 102 determines, in operation 208, that the message 118 accessed in operation 202 is associated with the abnormal behavior represented in the contextual message 122, the method 200 can proceed to operation 212. In operation 212, the computing device 102 can drop the message 118 obtained in operation 202 and/or otherwise restrict flow of the message 118, for example delaying delivery of the message 118, redirecting the message 118, or the like.

In some embodiments, the computing device 102 can interrupt the flow of the message 118 by accessing the message 118 in operation 202, though this is not necessarily the case. At any rate, the computing device 102 can be configured to determine, in operation 208, whether or not the message flow is allowed to resume based on a determination as to whether the message 118 is associated with the abnormal behavior, and if so, the computing device 102 can drop the message 118 or otherwise stop the flow of the message 118 to other network functions 116 in the core 104 to prevent interfering with operation of the core 104. It should be understood that this example is illustrative, and therefore should not be construed as being limiting in any way.

From operation 212, the method 200 can proceed to operation 214. The method 200 also can proceed to operation 214 from operation 210. The method 200 can end at operation 214.

Figure 3:
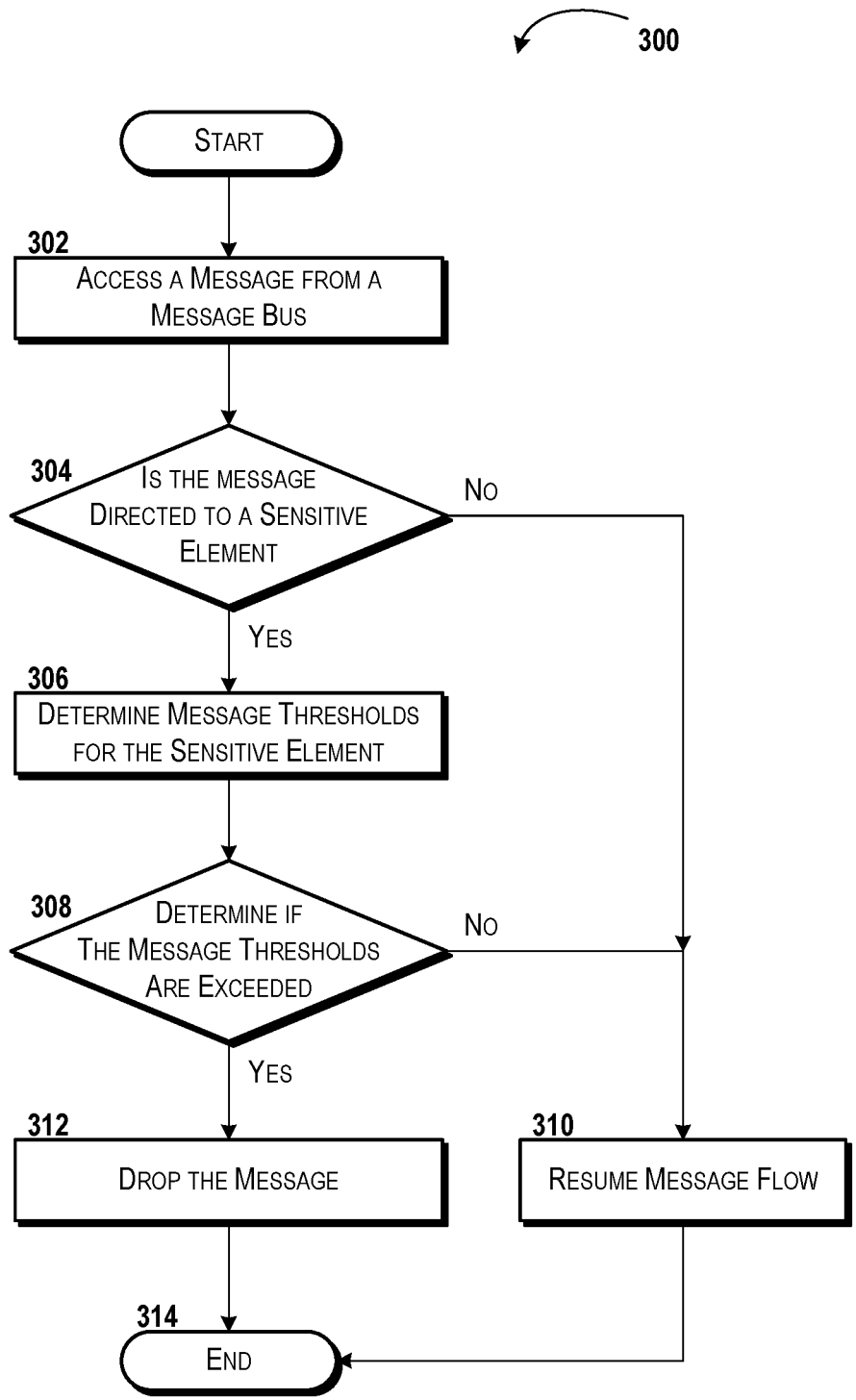
FIG. 3 is a flow diagram showing aspects of a method for using a message bus controller to protect 5G core elements, according to an illustrative embodiment of the concepts and technologies described herein.

Turning now to FIG. 3, aspects of a method 300 for using a message bus controller 108 to protect 5G core elements will be described in detail, according to an illustrative embodiment. For purposes of illustrating and describing the concepts of the present disclosure, the method 300 is described herein as being performed by the computing device 102 via execution of one or more software modules such as, for example, the message bus controller 108. It should be understood that additional and/or alternative devices and/or network nodes can provide the functionality described herein via execution of one or more modules, applications, and/or other software including, but not limited to, the message bus controller 108. Thus, the illustrated embodiments are illustrative, and should not be viewed as being limiting in any way.

The method 300 begins at operation 302. At operation 302, the computing device 102 can access, receive, or otherwise obtain a message 118. In some embodiments, the computing device 102 can access, receive, or otherwise obtain the message 118 from a message bus 120. As explained above, the computing device 102 (or the message bus controller 108 executed thereby) can be configured to monitor the message bus 120 and/or to subscribe to all messages 118 generated by elements (e.g., the network functions 116) associated with the core 104. As such, operation 302 can correspond to the computing device 102 (or the message bus controller 108 executed thereby) accessing, receiving, and/or otherwise obtaining a message 118 from the message bus 120.

From operation 302, the method 300 can proceed to operation 304. At operation 304, the computing device 102 can determine if the message 118 accessed, received, or otherwise obtained in operation 302 is directed to a sensitive element. As noted above, the phrase "sensitive element," as used herein, can be used to can refer to a network element (e.g., a network function 116) that can be susceptible to being overloaded by messages 118. The computing device 102 can maintain or access a list or other file that can identify one or more sensitive elements, or otherwise determining if an intended recipient (e.g., a subscriber) of the message 118 accessed in operation 302 is a sensitive element. Operation 304 therefore can correspond, in some embodiments, to the computing device 102 determining that the message 118 is directed to a sensitive element or not directed to a sensitive element. It should be understood that this example is illustrative, and therefore should not be construed as being limiting in any way.

If the computing device 102 determines, in operation 304, that the message 118 accessed in operation 302 is directed to a sensitive element, the method 300 can proceed to operation 306. At operation 306, the computing device 102 can determine message thresholds associated with the sensitive element to which the message 118 is directed (or that subscribes to the message 118). In some contemplated embodiments, the computing device 102 can determine the message thresholds in operation 306 based on a capacity of the sensitive element to which the message 118 is directed (or that subscribes to the message 118 that was accessed in operation 302). In some embodiments, the computing device 102 can query the sensitive element (e.g., a network function 116) to identify its capacity. In some other embodiments, the computing device 102 may access a list or other device or entity to determine the capacity of the network function 116. Because the capacity of the network function 116 can be determined in additional and/or alternative manners, it should be understood that these examples are illustrative, and therefore should not be construed as being limiting in any way.

The computing device 102 can be configured to set a message threshold that can be generated by the computing device 102 based on the capacity of the network function 116. In some embodiments, for example, the computing device 102 can define the message thresholds as seventy percent of the capacity of the network function 116 to which the message 118 was directed (or that subscribed to the message 118). In some other embodiments, the threshold can be set as a rate (e.g., a number of messages per unit time). In either case, the message thresholds can be based on a capacity or capability of the network function 116, though this is not necessarily the case. Because the message thresholds can be set in other manners (e.g., by a vendor, by software, by preferences, or the like), it should be understood that these examples are illustrative, and therefore should not be construed as being limiting in any way.

From operation 306, the method 300 can proceed to operation 308. At operation 308, the computing device 102 can determine if the message thresholds defined for the sensitive element are exceeded. In operation 308, the computing device 102 can therefore determine if the rate, count, or other message threshold associated with the sensitive element has been exceeded. Because a threshold can be determined to be exceed in additional and/or alternative manners, it should be understood that these examples are illustrative, and therefore should not be construed as being limiting in any way.

If the computing device 102 determines, in operation 308, that the message thresholds defined for the sensitive element are not exceeded, the method 300 can proceed to operation 310. The method 300 also can proceed to operation 310 from operation 304, if the computing device 102 determines, in operation 304, that the message 118 accessed in operation 302 is not directed to a sensitive element. At operation 310, the computing device 102 can allow the message flow associated with the message 118 accessed in operation 302 to resume.

In particular, as noted above, the computing device 102 can be configured to re-inject or return the message 118 to the message bus 120 to enable the message 118 to resume flow to the intended recipient and/or subscriber. Alternatively, the computing device 102 can be configured to resend the message 118, which may result in the message 118 being injected into the message bus 120 by the computing device 102. In another embodiment, the computing device 102 can be configured to stop delaying or pausing delivery of the message 118. Thus, it can be appreciated that operation 310 can correspond to the computing device 102 deciding not to interrupt the flow of the message 118 any further and/or the computing device 102 deciding that the message 118 should be sent or delivered. Because the flow of the message 118 can be resumed in additional and/or alternative manners, it should be understood that this example is illustrative, and therefore should not be construed as being limiting in any way.

If the computing device 102 determines, in operation 308, that the message thresholds are exceeded, the method 300 can proceed to operation 312. At operation 312, the computing device 102 can drop the message 118 obtained in operation 302 and/or otherwise restrict flow of or delete the message 118. As noted above, the flow of the message 118 can be restricted, in some embodiments, by delaying delivery of the message 118, in some embodiments. Thus, operation 312 can correspond to deleting the message 118, redirecting the message 118, delaying delivery of the message 118, or the like. The computing device 102 can be configured to determine to stop the flow of the message 118 to other network functions 116 in the core 104 to prevent interfering with operation of the core 104. It should be understood that this example is illustrative, and therefore should not be construed as being limiting in any way.

From operation 312, the method 300 can proceed to operation 314. The method 300 also can proceed to operation 314 from operation 310. The method 300 can end at operation 314.

Figure 4:
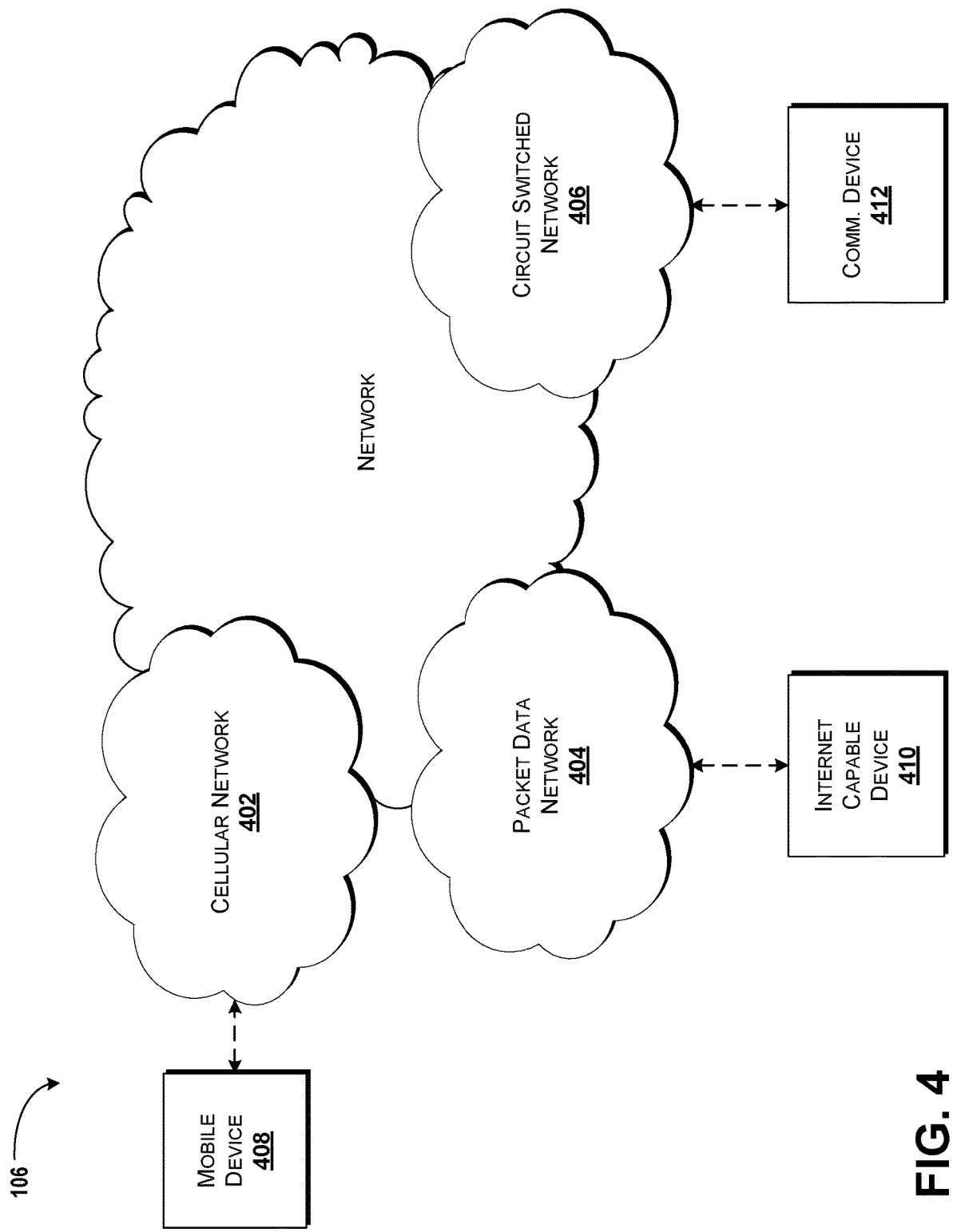
FIG. 4 schematically illustrates a network, according to an illustrative embodiment of the concepts and technologies described herein.

Turning now to FIG. 4, additional details of the cellular network 106 are illustrated, according to an illustrative embodiment. The cellular network 106 can include and/or can communicate with another cellular network 402, a packet data network 404, for example, the Internet, and a circuit switched network 406, for example, a publicly switched telephone network ("PSTN"). The cellular network 106 and/or the cellular network 402 can include various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G, 4.5G, and 5G mobile communications standards, as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the cellular network 106 is used to refer broadly to any combination of the networks 402, 404, 406. It should be appreciated that substantially all of the functionality described with reference to the cellular network 106 can be performed by the cellular network 402, the packet data network 404, and/or the circuit switched network 406, alone or in combination with other networks, network elements, and the like.

Figure 5:
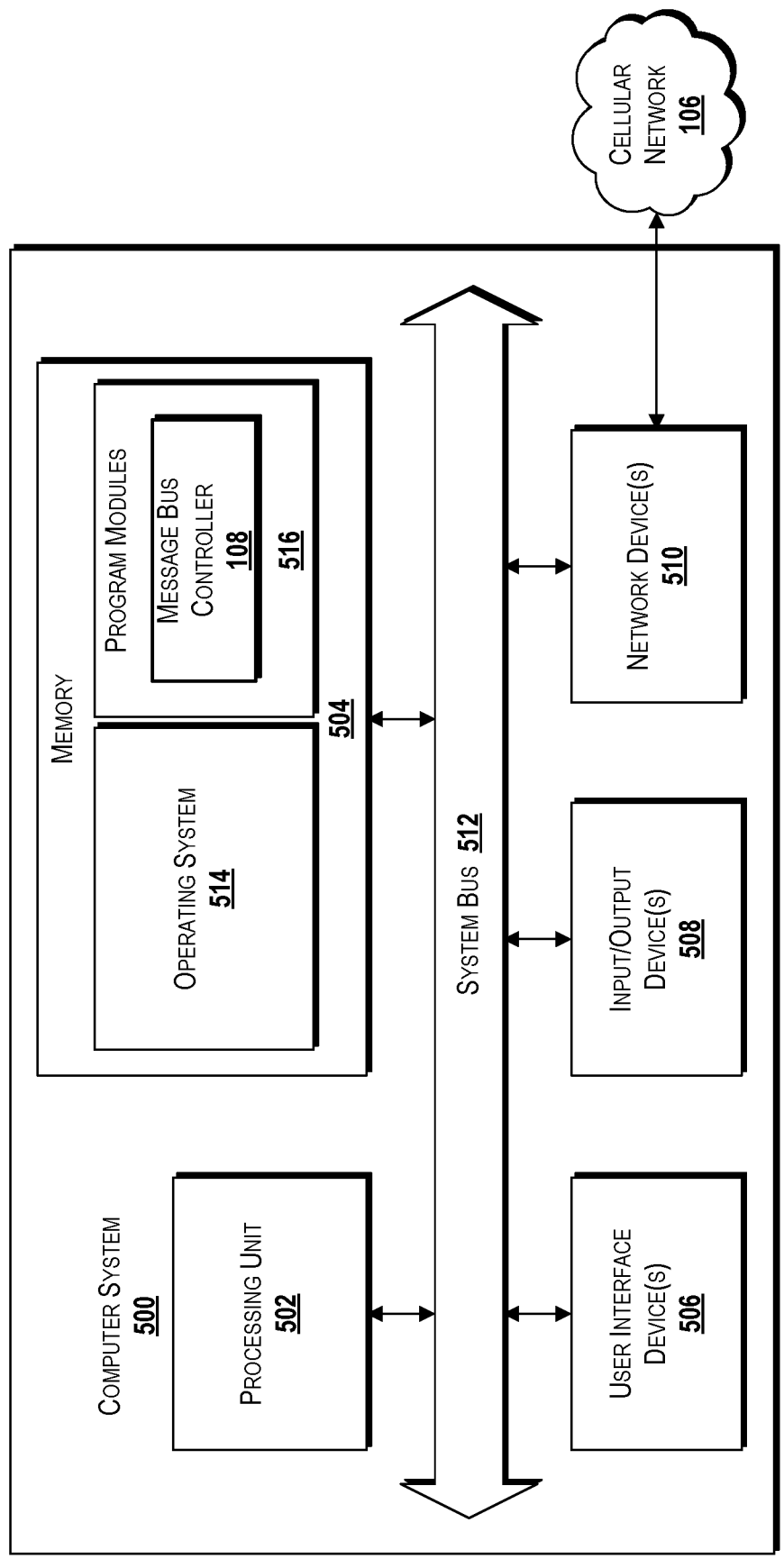
FIG. 5 is a block diagram illustrating an example computer system configured to provide a message bus controller to protect 5G core elements, according to some illustrative embodiments of the concepts and technologies described herein.

FIG. 5 is a block diagram illustrating a computer system 500 configured to provide the functionality described herein for using a message bus controller to protect 5G core elements, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the message bus controller 108, the network functions 116, and/or the threat monitor 124. These and/or other programs can be embodied in computer-readable media containing instructions that, when executed by the processing unit 502, can cause the computer system 500 to perform one or more of the methods 200 and/or 300 described in detail above with respect to FIGS. 2-3 and/or other functionality as illustrated and described herein.

It can be appreciated that, at least by virtue of the instructions embodying the methods 200 and/or 300 and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the message 118, the contextual message 122, the subscription list 128, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the cellular network 106. Examples of the network devices 510 include, but are not limited to, a modem, a radio frequency ("RF") or infrared ("IR") transceiver, a telephonic interface, a bridge, a router, or a network card. The cellular network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. The cellular network 106 also may access and/or include a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
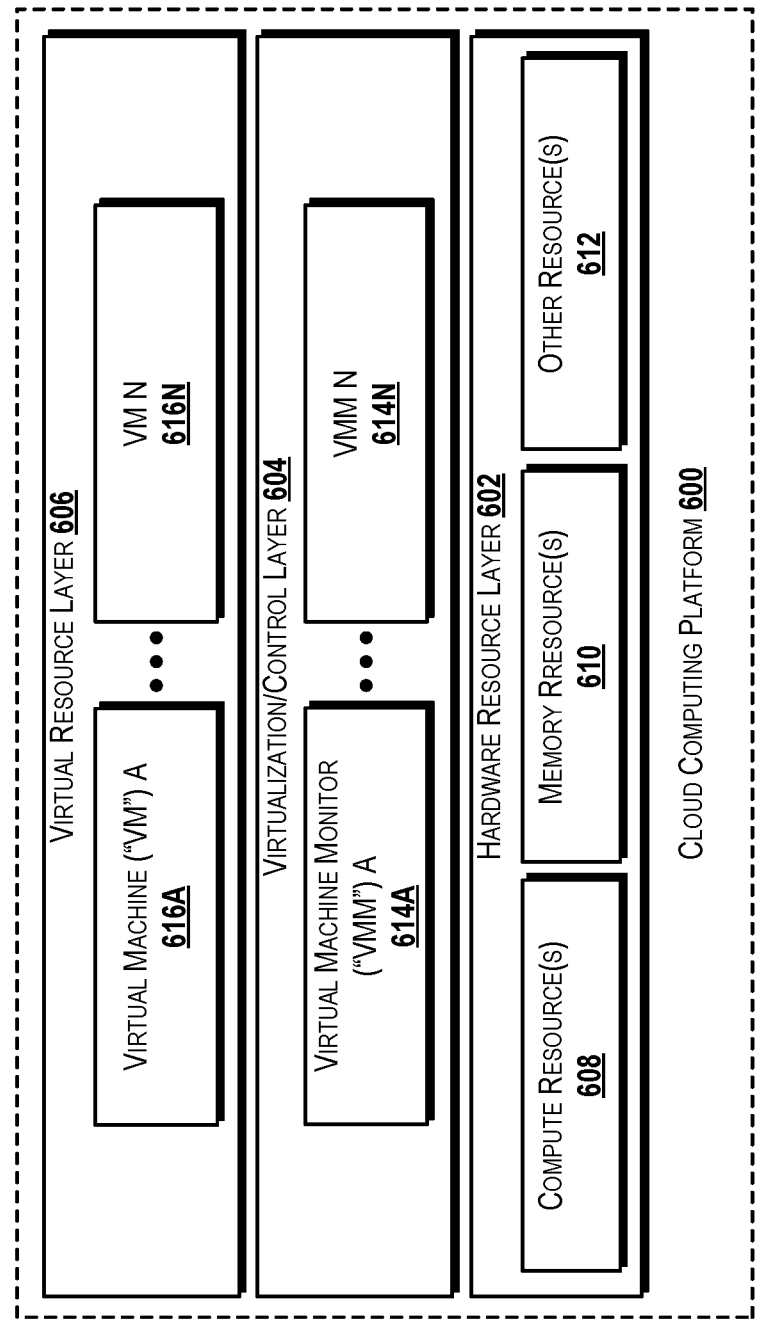
FIG. 6 is a diagram illustrating a computing environment capable of implementing aspects of the concepts and technologies disclosed herein, according to some illustrative embodiments of the concepts and technologies described herein.

FIG. 6 illustrates an illustrative architecture for a cloud computing platform 600 that can be capable of executing the software components described herein for using a message bus controller to protect 5G core elements and/or for interacting with message bus controller 108. Thus, it can be appreciated that in some embodiments of the concepts and technologies disclosed herein, the cloud computing platform 600 illustrated in FIG. 6 can be used to provide the functionality described herein with respect to the computing device 102 and/or other devices associated with the core 104 and/or the cellular network 106.

The cloud computing platform 600 thus may be utilized to execute any aspects of the software components presented herein. Thus, according to various embodiments of the concepts and technologies disclosed herein, the message bus controller 108, the network functions 116, and/or the threat monitor 124 can be implemented, at least in part, on or by elements included in the cloud computing platform 600 illustrated and described herein. Those skilled in the art will appreciate that the illustrated cloud computing platform 600 is a simplification of but only one possible implementation of an illustrative cloud computing platform, and as such, the illustrated cloud computing platform 600 should not be construed as being limiting in any way.

In the illustrated embodiment, the cloud computing platform 600 can include a hardware resource layer 602, a virtualization/control layer 604, and a virtual resource layer 606. These layers and/or other layers can be configured to cooperate with each other and/or other elements of a cloud computing platform 600 to perform operations as will be described in detail herein. While connections are shown between some of the components illustrated in FIG. 6, it should be understood that some, none, or all of the components illustrated in FIG. 6 can be configured to interact with one another to carry out various functions described herein. In some embodiments, the components are arranged so as to communicate via one or more networks such as, for example, the cellular network 106 illustrated and described hereinabove (not shown in FIG. 6). Thus, it should be understood that FIG. 6 and the following description are intended to provide a general understanding of a suitable environment in which various aspects of embodiments can be implemented, and should not be construed as being limiting in any way.

The hardware resource layer 602 can provide hardware resources. In the illustrated embodiment, the hardware resources can include one or more compute resources 608, one or more memory resources 610, and one or more other resources 612. The compute resource(s) 608 can include one or more hardware components that can perform computations to process data, and/or to execute computer-executable instructions of one or more application programs, operating systems, services, and/or other software including, but not limited to, the message bus controller 108, the network functions 116, and/or the threat monitor 124 illustrated and described herein.

According to various embodiments, the compute resources 608 can include one or more central processing units ("CPUs"). The CPUs can be configured with one or more processing cores. In some embodiments, the compute resources 608 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 608 can include one or more discrete GPUs. In some other embodiments, the compute resources 608 can include one or more CPU and/or GPU components that can be configured in accordance with a co-processing CPU/GPU computing model. Thus, it can be appreciated that in some embodiments of the compute resources 608, a sequential part of an application can execute on a CPU and a computationally-intensive part of the application can be accelerated by the GPU. It should be understood that this example is illustrative, and therefore should not be construed as being limiting in any way.

In some embodiments, the compute resources 608 also can include one or more system on a chip ("SoC") components. It should be understood that an SoC component can operate in association with one or more other components as illustrated and described herein, for example, one or more of the memory resources 610 and/or one or more of the other resources 612. In some embodiments in which an SoC component is included, the compute resources 608 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 608 can be or can include one or more hardware components arranged in accordance with an ARM architecture, available for license from ARM HOLDINGS of Cambridge, United Kingdom. Alternatively, the compute resources 608 can be or can include one or more hardware components arranged in accordance with an x86 architecture, such as an architecture available from INTEL CORPORATION of Mountain View, Calif., and others. Those skilled in the art will appreciate the implementation of the compute resources 608 can utilize various computation architectures and/or processing architectures. As such, the various example embodiments of the compute resources 608 as mentioned hereinabove should not be construed as being limiting in any way. Rather, implementations of embodiments of the concepts and technologies disclosed herein can be implemented using compute resources 608 having any of the particular computation architecture and/or combination of computation architectures mentioned herein as well as other architectures.

Although not separately illustrated in FIG. 6, it should be understood that the compute resources 608 illustrated and described herein can host and/or execute various services, applications, portals, and/or other functionality illustrated and described herein. Thus, the compute resources 608 can host and/or can execute the message bus controller 108, the network functions 116, the threat monitor 124, or other applications or services illustrated and described herein.

The memory resource(s) 610 can include one or more hardware components that can perform or provide storage operations, including temporary and/or permanent storage operations. In some embodiments, the memory resource(s) 610 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 608, subject to the definition of "computer storage media" provided above (e.g., as excluding waves and signals per se and/or communication media as defined in this application).

Although not illustrated in FIG. 6, it should be understood that the memory resources 610 can host or store the various data illustrated and described herein including, but not limited to, the messages 118, the contextual messages 122, the subscription list 128, and/or other data, if desired. It should be understood that this example is illustrative, and therefore should not be construed as being limiting in any way.

The other resource(s) 612 can include any other hardware resources that can be utilized by the compute resources(s) 608 and/or the memory resource(s) 610 to perform operations. The other resource(s) 612 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 602 can be virtualized by one or more virtual machine monitors ("VMMs") 614A-614N (also known as "hypervisors;" hereinafter "VMMs 614"). The VMMs 614 can operate within the virtualization/control layer 604 to manage one or more virtual resources that can reside in the virtual resource layer 606. The VMMs 614 can be or can include software, firmware, and/or hardware that alone or in combination with other software, firmware, and/or hardware, can manage one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616").

Based on the foregoing, it should be appreciated that systems and methods for using a message bus controller to protect 5G core elements have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      accessing, by a computing device that executes a message bus controller, a message in a message bus of a packet core of a cellular network, wherein the message is generated by a first network function and transmitted to a second network function via the message bus, and wherein the second network function subscribes to messages from the first network function,
      in response to a determination that delivery of the message to the second network function should be restricted, dropping, by the computing device, the message, and
      in response to a determination that the delivery of the message to the second network function should not be restricted, resuming, by the computing device, a message flow associated with the message.

2. The system of claim 1, wherein determining that the delivery of the message to the second network function should not be restricted comprises:
   determining, by the computing device, that the message is not directed to a sensitive element, comprising a network element that is susceptible to overflow attacks or distributed denial of service attacks.

3. The system of claim 1, wherein determining that the delivery of the message to the second network function should not be restricted comprises:
   determining, by the computing device, that the message is directed to a sensitive element, comprising a network element that is susceptible to overflow or distributed denial of service attacks; and
   in response to a determination that the message is directed to the sensitive element,
      determining, by the computing device, a capacity of the sensitive element,
      defining, by the computing device, a message threshold for the sensitive element based on the capacity determined,
      when a determination is made that the message threshold is exceeded, dropping, by the computing device, the message, and
      when a determination is made that the message threshold is not exceeded, determining, by the computing device, that the delivery of the message to the second network function should not be restricted.

4. The system of claim 1, wherein determining that the delivery of the message to the second network function should not be restricted comprises:

accessing, by the computing device, a contextual message that describes abnormal activity in the cellular network, the abnormal activity being associated with a user device;

identifying, by the computing device, a plurality of messages that are associated with the abnormal activity;

in response to a determination based on the plurality of messages that the message is associated with the abnormal activity, determining, by the computing device, that the delivery of the message to the second network function should be restricted; and in response to a determination based on the plurality of messages that the message is not associated with the abnormal activity, determining, by the computing device, that the delivery of the message to the second network function should not be restricted.

5. The system of claim 4, wherein accessing the contextual message comprises obtaining the contextual message from the message bus, wherein the contextual message is generated by a network data analytic function operating in the packet core.

6. The system of claim 4, wherein accessing the contextual message comprises receiving the contextual message from a threat monitor via a separate interface of the message bus controller, wherein the contextual message is generated by the threat monitor.

7. A method comprising:

accessing, by a computing device comprising a processor that executes a message bus controller, a message in a message bus of a packet core of a cellular network, wherein the message is generated by a first network function and transmitted to a second network function via the message bus, and wherein the second network function subscribes to messages from the first network function;

in response to a determination that delivery of the message to the second network function should be restricted, dropping, by the processor, the message; and in response to a determination that the delivery of the message to the second network function should not be restricted, resuming, by the processor, a message flow associated with the message.

8. The method of claim 7, wherein determining that the delivery of the message to the second network function should not be restricted comprises:

determining, by the processor, that the message is not directed to a sensitive element comprising a network element that is susceptible to overflow attacks or distributed denial of service attacks.

9. The method of claim 7, wherein determining that the delivery of the message to the second network function should not be restricted comprises:

determining, by the processor, that the message is directed to a sensitive element comprising a network element that is susceptible to overflow or distributed denial of service attacks; and in response to a determination that the message is directed to the sensitive element, determining, by the processor, a capacity of the sensitive element, defining, by the processor, a message threshold for the sensitive element based on the capacity determined, when a determination is made that the message threshold is exceeded, dropping, by the processor, the message, and when a determination is made that the message threshold is not exceeded, determining, by the processor, that the delivery of the message to the second network function should not be restricted.

10. The method of claim 9, wherein the capacity is determined by the computing device querying the sensitive element to determine the capacity.

11. The method of claim 9, wherein the message threshold is defined by the processor as seventy percent of the capacity determined.

12. The method of claim 7, wherein determining that the delivery of the message to the second network function should not be restricted comprises:

accessing, by the processor, a contextual message that describes abnormal activity in the cellular network, the abnormal activity being associated with a user device;

identifying, by the processor, a plurality of messages that are associated with the abnormal activity;

in response to a determination based on the plurality of messages that the message is associated with the abnormal activity, determining, by the processor, that the delivery of the message to the second network function should be restricted; and in response to a determination based on the plurality of messages that the message is not associated with the abnormal activity, determining, by the processor, that the delivery of the message to the second network function should not be restricted.

13. The method of claim 12, wherein accessing the contextual message comprises obtaining the contextual message from the message bus, wherein the contextual message is generated by a network data analytic function operating in the packet core.

14. The method of claim 12, wherein accessing the contextual message comprises receiving the contextual message from a threat monitor via a separate interface of the message bus controller, wherein the contextual message is generated by the threat monitor.

15. A computer storage medium having computer-executable instructions stored thereon that, when executed by a processor, cause the processor to perform operations comprising:

accessing, by a computing device that executes a message bus controller, a message in a message bus of a packet core of a cellular network, wherein the message is generated by a first network function and transmitted to a second network function via the message bus, and wherein the second network function subscribes to messages from the first network function;

in response to a determination that delivery of the message to the second network function should be restricted, dropping, by the computing device, the message; and in response to a determination that the delivery of the message to the second network function should not be restricted, resuming, by the computing device, a message flow associated with the message.

16. The computer storage medium of claim 15, wherein determining that the delivery of the message to the second network function should not be restricted comprises:

determining, by the computing device, that the message is not directed to a sensitive element, comprising a network element that is susceptible to overflow or distributed denial of service attacks.

17. The computer storage medium of claim 15, wherein determining that the delivery of the message to the second network function should not be restricted comprises:

determining, by the computing device, that the message is directed to a sensitive element comprising a network element that is susceptible to overflow or distributed denial of service attacks; and in response to a determination that the message is directed to the sensitive element,
- determining, by the computing device, a capacity of the sensitive element,
- defining, by the computing device, a message threshold for the sensitive element based on the capacity determined,
- when a determination is made that the message threshold is exceeded, dropping, by the computing device, the message, and
- when a determination is made that the message threshold is not exceeded, determining, by the computing device, that the delivery of the message to the second network function should not be restricted.

18. The computer storage medium of claim 15, wherein determining that the delivery of the message to the second network function should not be restricted comprises:
- accessing, by the computing device, a contextual message that describes abnormal activity in the cellular network, the abnormal activity being associated with a user device;
- identifying, by the computing device, a plurality of messages that are associated with the abnormal activity;
- in response to a determination based on the plurality of messages that the message is associated with the abnormal activity, determining, by the computing device, that the delivery of the message to the second network function should be restricted; and
- in response to a determination based on the plurality of messages that the message is not associated with the abnormal activity, determining, by the computing device, that the delivery of the message to the second network function should not be restricted.

19. The computer storage medium of claim 18, wherein accessing the contextual message comprises obtaining the contextual message from the message bus, wherein the contextual message is generated by a network data analytic function operating in the packet core.

20. The computer storage medium of claim 18, wherein accessing the contextual message comprises receiving the contextual message from a threat monitor via a separate interface of the message bus controller, wherein the contextual message is generated by the threat monitor.

* * * * *